United States Patent [19]
Dezawa et al.

[11] 4,016,057
[45] Apr. 5, 1977

[54] PROCESS OF PRODUCING FERROMAGNETIC MATERIALS

[75] Inventors: Shin-ichiro Dezawa; Yasuo Tamai, both of Odawara, Japan

[73] Assignee: Fuji Photo Film Co., Ltd., Minami-ashigara, Japan

[22] Filed: Dec. 1, 1975

[21] Appl. No.: 636,464

[30] Foreign Application Priority Data

Nov. 29, 1974 Japan .......................... 49-137934
Nov. 29, 1974 Japan .......................... 49-137935

[52] U.S. Cl. ............................................. 204/130
[51] Int. Cl.² ......................................... C25C 5/00
[58] Field of Search .................................... 204/130

*Primary Examiner*—R. L. Andrews
*Attorney, Agent, or Firm*—Sughrue, Rothwell, Mion, Zinn & Macpeak

[57] ABSTRACT

Ferromagnetic particles having a high squareness ratio, high coercivities, and stable magnetic properties are prepared by electrolyzing ferromagnetic particles in an aqueous electrolyte using a cathode carrying ferromagnetic particles. The ferromagnetic particles thus treated may be then subjected to a heat treatment, if desired. When the ferromagnetic particles are iron oxide particles, the aqueous electrolyte contains a compound of a transition element.

19 Claims, 2 Drawing Figures

U.S. Patent
April 5, 1977
4,016,057
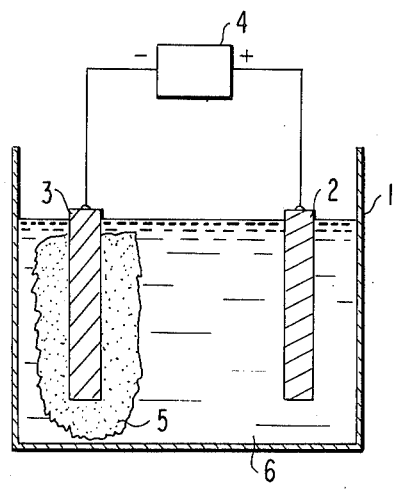
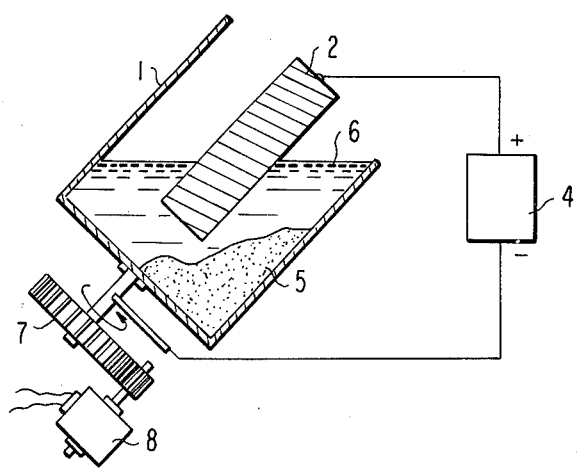

PROCESS OF PRODUCING FERROMAGNETIC MATERIALS

BACKGROUND OF THE INVENTION

1. Field of the Invention

The present invention relates to a process of producing ferromagnetic materials.

2. Description of the Prior Art

Maghemite (gamma-$Fe_2O_3$) has hitherto been widely used for magnetic recording media such as audio magnetic tapes, video magnetic tapes, memory tapes, magnetic sheets, magnetic cards, etc. Also, cobalt ferrite prepared by incorporating cobalt, etc., in maghemite has been used as a high-coercivity material.

These magnetic recording media can be used in a wide technical field for recording and reproducing electrical or magnetic signals and, in particular, recording signals of short wave lengths at high density has become important recently. For such use ferromagnetic materials are required to show magnetic recording characteristics suitable for high-density recording, such as a high coercivity and a high residual magnetic flux density. Furthermore, ferromagnetic materials in which magnetic signals are not demagnetized by pressure, e.g., due to repeated reproduction, have been required.

As one example of ferromagnetic materials showing low demagnetization which are suitable for high-density recording, there are Berthollide-type iron oxide particles containing a transition element.

Such magnetic materials have a variable oxidation ratio and comprise compounds shown by the following formula $$M_yFe_{1+y}O_x$$

wherein M represents a transition element or at least one element selected from the group consisting of the elements belonging to groups IIIb, IVb, VIb, VIIb, VIII, Ib, and IIb of the Periodic Table, y is a number between 0.001 and 0.25, and x is a number between 1.33 and 1.50.

Such high-power ferromagnetic materials are commercially available as, for example, Beridox (produced by Fuji Photo Film Co.).

The transition element improves the magnetic properties of the ferromagnetic iron oxide particles. The transition element is usually added to ferromagnetic iron oxide particles or iron oxyhydroxide particles. The inventors earlier found that the more uniformly the addition of the transition element to the Berthollide type ferromagnetic iron oxide particles is carried out, the more improved the erasure characteristics and the print-through characteristics of the resulting magnetic recording medium (characteristics important once signals are recorded on a magnetic recording medium and one wishes to re-record thereon other signals). Print-through or magnetic reprint is the phenomenon where signals recorded on a magnetic recording medium are printed or transferred onto adjacent magnetic recording medium by the magnetic field originating from the signals, and it is important that a magnetic recording medium shows such a phenomenon to a low degree.

In the case of incorporating a transition element in such ferromagnetic iron oxide particles, iron oxide particles or iron oxyhydroxide particles are dispersed in water and the first of two solutions which cause the formation of a precipitated salt of the transition element by reaction when they are mixed together is added to the dispersion followed by mixing to provide a slurry. Then, the second solution is added to the slurry to form a precipitate of the salt of the transition element on the surface of the iron oxide particles or the iron oxyhydroxide particles. The particles are then recovered by filtration, dried, and subjected to a heating to fix the transition element in the particles or on the surfaces of the particles. Such processes are described in detail in, for example, Japanese Patent Publication 6538/1966, and Japanese Patent Application Laid Open Nos. 76,097/73 and 22,707/72.

A particularly important matter in such operations is that the precipitate containing the transition element be fixed uniformly on or in the iron oxide particles or oxyhydroxide particles.

Chromium dioxide ($CrO_2$) is also known as a ferromagnetic substance suitable for magnetic recording medium. That is, a magnetic recording medium having a magnetic recording layer composed of an organic binder and fine chromium dioxide particles dispersed in the binder is superior to a conventional magnetic recording medium having a maghemite (gamma-$Fe_2O_3$) per se magnetic recording layer at the following points:

1. Since chromium dioxide particles have good dispersibility in a binder, a magnetic recording medium prepared using chromium dioxide particles has a smooth surface.
2. Chromium dioxide particles show high coercivity, e.g., 400–700 oersteds, and thus such a magnetic recording medium is suitable for high-density recording.
3. Chromium dioxide particles possess a high squareness ratio (Br/Bm), e.g., 0.85-0.9, due to their good dispersibility in a binder.
4. Since chromium dioxide particles possess a high magnetic flux density, it is possible to reduce the thickness of the magnetic recording layer.
5. Chromium dioxide particles also possess a comparatively low Curie point, which makes it possible to practice thermal duplication of recordings.

Processes of producing chromium dioxide particles suitable for magnetic recording are described in, for example, U.S. Pat. Nos. 3,449,073; 3,278,263; 3,696,039; 3,371,043; 3,687,851; 3,600,315; 3,600,314; 3,778,373; etc. Chromium dioxide particles prepared by these processes can be used in the process of this invention.

The magnetic properties, in particular, the coercivity of chromium dioxide, can be changed using modifiers during or after the production thereof. Techniques involving such modifiers are described in, for example, U.S. Pat. Nos. 3,574,115; 3,687,851; 3,583,917; 3,726,714; 2,886,365; 2,923,683; etc. The chromium dioxide particles prepared by these processes are also suitable as the raw materials treated by the process of this invention.

However, it has become clear that chromium dioxide has various faults. That is, when a magnetic recording medium having a chromium dioxide layer is stored under high temperature humidity conditions, saturation magnetization ($\sigma S$) is reduced. Furthermore, chromium dioxide is partially decomposed and thus chromium ions tend to dissolve out.

It is known, to improve these faults, to stabilize chromium dioxide particles by coating the surfaces of the particles with a proper material, e.g., as described in U.S. Pat. Nos. 3,687,726; 3,512,930; 3,686,031; 3,586,630; 3,585,141; 3,736,181; 3,769,087; etc. In these processes chromium dioxide particles are stabilized by coating the surfaces of the particles with an inorganic compound such as CrOOH, $Sb_2O_3$, $As_2O_3$, $Sb_2S_3$, $As_2S_3$, $Al_2O_3$, a phosphate, aluminum hydroxide, etc., or by treating the surfaces of the particles with an organic phosphorus compound or an organic cyclic amine.

The inventors investigated these processes and, as a result, discovered that these processes cannot provide a sufficient effect for the desired purpose, i.e., the chromium dioxide particles are apt to become coarser and, further, their dispersibility is apt to become lower. In this case, the inherent excellent surface properties of a chromium dioxide magnetic recording medium are likely to be lost. Further, these conventional stabilization processes require delicate operation techniques, and if the stabilization treatment is prolonged, magnetization is apt to be reduced. It has further been found that when chromium dioxide particles subjected to such a stabilization treatment are kneaded with a binder, the coated layers on the particle surfaces are gradually destroyed. This is considered to be caused by poor adhesivity between the coated layer and the inside chromium dioxide particle.

As the results of investigations on the aforesaid points, the inventors have succeeded in discovering a new process of producing and/or stabiliing ferromagnetic materials.

SUMMARY OF THE INVENTION

An object of the invention is to provide a novel process of producing and/or stabilizing ferromagnetic materials.

A broad object of the present invention is to provide a novel process for producing ferromagnetic particles which possess excellent properties for high density magnetic recording, e.g., high coercivity, high saturation magnetization, narrow coercive force distribution, high squareness ratio, excellent erasure characteristics and excellent print-through characteristics.

Another object of the present invention is to provide ferromagnetic particles of a particle size of about 0.1 to about 2 $\mu$m, preferably 0.2 to 1.5 $\mu$m and of an acicular ratio of about 1/1 to about 20/1, preferably 3/1 to 10/1.

Still yet a further object of the invention is to provide ferromagnetic iron oxide containing particles of a coercive force (Hc) of about 200 to about 500 Oe, preferably 250 to 450 Oe, and chromium dioxide containing particles of an Hc of from about 400 to about 800 Oe, preferably 250 to 450 Oe, and chromium dioxide containing particles of an Hc of from about 400 to about 800 Oe, preferably 500 to 700 Oe.

Another object of this invention is to provide a novel process of producing ferromagnetic iron oxide particles containing a transition element or transition elements.

Still another object of this invention is to provide ferromagnetic iron oxide particles possessing high coercivity and high saturation magnetization.

A further object of this invention is to provide ferromagnetic iron oxide particles showing a narrow coercive force distribution.

Yet another object of this invention is to provide ferromagnetic iron oxide particles capable of providing magnetic recording media possessing a high squareness ratio.

Still a further object of this invention is to provide ferromagnetic iron oxide particles having excellent erasure characteristics.

Still another object of this invention is to provide ferromagnetic iron oxide particles showing excellent print-through characteristics.

Another object of this invention is to provide improved acicular ferromagnetic iron oxide particles containing cobalt in an amount of about 0 to 20 atomic %, preferably 0.5 to 15 atomic %.

One further object of this invention is to provide a novel stabilization process for chromium dioxide particles.

Another object of this invention is to provide a process of stabilizing chromium dioxide particles, which is suitable for providing a magnetic recording layer or magnetizable layer having a smooth surface.

Still another object of this invention is to provide stabilized chromium dioxide particles of excellent adhesivity between the coated layer and the internal chromium dioxide particle.

That is, according to the present invention, there is provided a process of producing ferromagnetic materials which comprises electrolyzing ferromagnetic particles in an aqueous electrolyte using a cathode carrying the ferromagnetic particles.

According to one highly preferred embodiment of the present invention there is provided a process of producing ferromagnetic materials which comprises electrolyzing ferromagnetic iron oxide particles in an aqueous electrolyte containing a transition element using a cathode carrying iron oxide particles.

According to further embodiment of the present invention there is provided a process of producing ferromagnetic particles which comprises electrolyzing chromium dioxide particles using a cathode carrying chromium dioxide particles.

Both iron oxide and chromium dioxide are illustrative of materials which possess high electrical conductivity which permits utilization in the process of this invention. Chromium dioxide particles treated by the process are uniformly chemically stabilized by the cathode treatment.

According to one especially preferred embodiment of the present invention, there is provided a process of producing ferromagnetic iron oxide materials which comprises electrolyzing ferromagnetic iron oxide particles in an aqueous electrolyte containing a transition element using a cathode carrying the ferromagnetic iron oxide materials and then subjecting the ferromagnetic iron oxide particles to a heat treatment.

BRIEF DESCRIPTION OF THE DRAWING

FIG. 1 is a schematic view showing an embodiment of apparatus used for the practice of the process of this invention.

FIG. 2 is a schematic view showing an embodiment of another apparatus used for the practice of the process of this invention.

DESCRIPTION OF THE PREFERRED EMBODIMENTS

Now, the invention will be explained by referring to the embodiment illustrated in FIG. 1 of the accompanying drawings, which shows the state of producing/stabilizing the ferromagnetic particles while carrying the particles on a cathode by magnetic attraction. In FIG. 1, a container or electrolytic cell 1 contains an electrolyte 6, an anode 2, and a cathode 3. The cathode 3 is made of a magnet and carries thereon ferromagnetic particles 5 by magnetic attraction. In this case, since the particles are a conductive substance, the cathode 3 is electrically connected with the ferromagnetic particles and thus the particles carried on the cathode 3 also act as a cathode. In general, essentially all ferromagnetic particles which are processed are in electrical contact with the cathode either by contacting the cathode or contacting one or more other ferromagnetic particles in contact with the cathode. The cathode 3 and the anode 2 are connected to an electric power source 4, and a negative potential and a positive potential is applied to the cathode and anode, respectively. In the embodiment illustrated in FIG. 1, it is preferred that the anode 3 be made of chromium dioxide, a ferrite such as iron oxide when chromium dioxides particles are being electrolyzed, or a metal. Furthermore, it is preferred that the surface of the cathode be covered by a material having a high hydrogen over-voltage, such as lead, mercury, cadmium, graphite, bismuth, tin, indium, thallium, etc. If the coating material has a low hydrogen over-voltage, the electric potential is insufficiently applied to the chromium dioxide particles and a considerable part of the input electric energy is lost due to generation of hydrogen at the surface of the cathode. Thus, while such a low-over-voltage is not preferred for processing chromium dioxide it can be used for some other ferromagnetic particles, e.g., iron oxide.

The hydrogen over-voltage can be calculated by Tafel's formula for over-voltage ($\eta$);

$$\eta = a - b \ln D$$

wherein D is the current density in A/cm², $a$ and $b$ are constants an ln is the natural logarithm. The constant $a$ is 0.1–1.4 volts (absolute value) and is determined by the kind of the cathode and the temperature and the kind of the electrolyte. The constant $b$ is 0.09–0.13 and is theoretically shown by the following formula;

$$b = RT/\alpha F$$

wherein R is the gas constant, T is the absolute temperature, F is the Faraday constant, and $\alpha$ is the mobility.

The constants $a$ and $b$ can be determined from the literature or by experiment. For example, apparatus comprising the cathode, anode and a standard electrode in the electrolyte is prepared with the power supply between the anode and cathode. The current density of the cathode can be measured by a current meter. The potential difference between the cathode and the standard electrode can be measured by conventional means. The potential of the cathode Ec can be determined in a conventional manner from measurements on such a system, and $a$ and $b$ determined from a plot of -Ec versus ln D ($a$ is the intersection of the plot line with the Y axis and $b$ is determined by the slope of the plot line).

By the above formula, the material or element used for coating the surface of the cathode has a value for $a$ larger than −1,000 millivolts (absolute value).

While not limitative, it is preferred that the current density used in the process of the present invention be about 0.1 to about 10 A/dm², most preferably 3 to 5 A/dm².

Processing is most conveniently at atmospheric pressure, though if one wishes to use more complicated apparatus sub- and super-atmospheric operation can be practiced.

Processing can be effected from the melting point to the boiling point of the electrolyte, if desired, and is conveniently performed at room temperature to about 100° C in most cases.

The process time varies depending upon the capacity of the apparatus, the amount of ferromagnetic particles present (M, Kg) and the electric current (I, A), but generally the time ($t$ in min) can be selected according to formula:

IT/M = 1~100,000, preferably 5~5,000

The ferromagnetic particles are conveniently used in an amount of about 1 to about 20 wt%, preferably 2 to 10 wt%, based on the amount of electrolyte employed. If substantially lesser amounts are used, electric energy tends to be converted into heat in the liquid, whereas the ferromagnetic particles tend to be too much in the liquid when their amount is excessively greater.

As the anode 2, any conductive material can be used, e.g., platinum, rhodium, gold, tungsten, nickel, cobalt, chromium, molybdenum, carbon, iron, silver, copper, manganese etc., can be used, but more desirable results are obtained in the ferromagnetic iron oxide embodiment when a metal the same as the metal component of a metal salt added to the electrolyte is used as the amode.

As illustrated in FIG. 2, the ferromagnetic particles 5 are placed in a cathode barrel together with an electrolyte 6. The barrel 1 is electrically connected (electric current arrives at the cathode through the ferromagnetic particles from the solution) to the ferromagnetic particles 5 since the ferromagnetic particles are a conductive material (have low electrical resistance), such as magnetite type or Berthollide type iron oxide particles or chromium dioxide. Therefore, the ferromagnetic particles 5 carried in the cathode barrel 1 act also as a cathode. The cathode barrel 1 and the anode 2 are connected to an electric power source 4 and a negatial potential and a positive potential are applied to the cathode and the anode respectively. Taking chromium dioxide as illustrative, in this case the electric connection between the chromium dioxide particles and the inside surface of the barrel is maintained due to the chromium dioxide particles sedimenting in the electrolyte to maintain contact between the particles and the particles and the inside surface of the barrel; a similar effect is encountered with iron oxide particles.

It is preferred that the inside surface of the cathode barrel 1 be made of a conductive substance such as iron, lead, copper, tin, cadmium, bismuth, indium, graphite, nickel, cobalt, chromium, and molybdenum, especially when iron oxide particles are being treated. There is no criticality to the conductive substance chosen.

In the embodiment of FIG. 2 the rotary cathode barrel 1 is rotated slowly by means of a motor 8 and a driving system 7. An electric potential is applied to the anode 2 and the cathode barrel 1 by an electric power source 4. The barrel is preferably rotated at a rate of 0.2–30 r.p.m. and thus the ferromagnetic particles in the barrel are stirred, which renders uniform the treatment thereof. A slower rotation rate can be used, but this will increase process times. While somewhat faster rotation rates can also be used, particles float in the solution if the rotation rate is too fast, which brings them out of contact with the cathode.

In the invention, it is preferred to apply to both electrodes a d.c. potential of about 0.2–60 volts, particularly 0.4–40 volts.

For the preferred embodiment of the present invention wherein ferromagnetic chromium dioxide particles are electrolyzed using a cathode carrying thereon ferromagnetic chromium dioxide particles, it is most preferred to apply a d.c. potential of about 0.2–40 volts, preferably 0.5–30 volts, between both electrodes.

For the embodiment wherein chromium dioxide particles are being electrolyzed, if the potential is lower than about 0.2 volts, the stabilization of the chromium dioxide particles is insufficient, while for the embodiment wherein the ferromagnetic iron oxide particles are being electrolyzed if the potential is lower than about 0.2 volts the transition element(s) will be insufficiently incorporated into the iron oxide particles. For the ferromagnetic iron oxide embodiment, if the potential is higher than about 60 volts, the electrical power is largely consumed to generate hydrogen which renders the process uneconomical, and the iron oxide particles are apt to be scattered in the electrolyte. A similar effect is encountered with the chromium dioxide embodiment, but in this embodiment it is preferred to operate at a potential less than about 40 volts.

In the aforesaid embodiment, a rotary barrel is used as the cathode for treating the ferromagnetic particles but other type of cathodes or electrolytic cells can, of course, be used in the process of this invention.

For example, a magnetic type cathode can be used as the cathode carrying the ferromagnetic particles and in this case the ferromagnetic particles are attracted to the cathode by magnetic attraction. In this embodiment the ferromagnetic property of the ferromagnetic particles is effectively utilized and thus the ferromagnetic particles are prevented from being moved in the electrolyte.

For example, a permanent magnet and/or an electromagnet can be wrapped or coated with a material having a high over-voltage, if desired to serve as an electrode. The core is thus of a magnetic material. In this case, ferromagnetic particles such as iron oxide gathers around the cathode by magnetic force as shown in FIG. 1. In the same manner, ferromagnetic particles can be made to bridge between a U-shaped magnetic electrode, if desired.

The period of time required for passing electric current depends upon the areas of electrodes, the amount of the ferromagnetic particles, the concentration of the electrolyte, etc., but it has been confirmed that generally an electrolysis time of for about 20 to 30 seconds to one hour is preferred.

Generally, for the ferromagnetic iron oxide embodiment, it is preferred to conduct the electrolysis for at least about 30 seconds to insure uniform incorporation of the transition element(s). On the other hand, somewhat lesser times can be used with the ferromagnetic chromium dioxide embodiment since the desired stabilization treatment can be obtained by electrolysis for at least about 20 seconds.

Further, if a conductive material having a high hydrogen over-voltage, such as lead, tin, cadmium, graphite, bismuth, indium, and thallium is used among the aforesaid cathode materials for the electrolysis of iron oxide particles, the valence of the transition element deposited on the surfaces of the iron oxide particles becomes lower, that is, the reaction occuring near the cathode is mainly a reduction. On the other hand, if a conductive material possessing a comparatively low hydrogen over-voltage, such as iron, nickel, cobalt, chromium, etc., is used, the reaction occuring near the cathode is mainly the electrolysis of water and thus the electrolyte near the cathode becomes alkaline. Thus, the hydroxide or oxyhydroxide of the transition element is precipitated. It is thus preferred that a be larger than an absolute value of −1000 mV. When $CrO_2$ is used, the effects are remarkably decreased when $a$ is smaller than the above value. Accordingly, it is not preferred to use Fe or Cr metals as the cathode or as the electrolyte per se. According to the inventors' research, it has been concluded that the aforesaid two reactions are apt to occur simultaneously and lower hydroxides or oxyhydroxides containing partially a transition element are formed near the cathode for the iron oxide embodiment. It has further been confirmed that the process of this invention can be performed when a transition element is present effectively in any cases of the occurence of these reactions.

When chromium dioxide particles are being electrolyzed, is preferred that the inside surface of the barrel is coated or covered by a material having a high hydrogen over-voltage as described in regard to the apparatus shown in FIG. 1. Furthermore, the materials stated as the anode material in regard to the apparatus shown in FIG. 1 can be also used as the anode in the embodiment of FIG. 2. Water or the aqueous solution of the electrolytes described in regard to the embodiment shown in FIG. 1 can be also used as the electrolyte 6.

The electrolyte utilized in the process of the present invention is an aqueous medium, i.e., water or a mixture of water and a water miscible organic solvent. When ferromagnetic chromium dioxide is being treated, the electrolyte is preferably water or an aqueous solution of an electrolyte. When ferromagnetic iron oxide particles are being treated, the electrolyte is preferably water or a mixture of water and water miscible solvent, each having dissolved therein a soluble salt of a transition element or elements.

The pH of the electrolyte is generally about 1–13. For the embodiment wherein ferromagnetic iron oxide particles are being electrolyzed, the pH of the electrolyte is about 1 to about 8, preferably 3–6.

To control the pH of the electrolyte, a conventional complexing agent, pH buffer, or pH controlling agent may be added to the electrolyte, if necessary. As pH buffers and complexing agents, there are monocarboxylic acids such as formic acid, acetic acid, propionic acid, butyric acid, valeric acid, acrylic acid, trimethylacetic acid, benzoic acid, chloroacetic acid, etc., and the salts of these acids. As the complexing agents, there are dicarboxylic acids such as oxalic acid, succinic acid, malonic acid, itaconic acid, p-phthalic acid, etc., and the salts thereof, and oxydicarboxylic acids such as glycolic acid, lactic acid, salicylic acid, tartaric acid, citric acid, etc., and the salts thereof. Furthermore, as the pH controlling agents and pH buffers, there are boric acid, carbonic acid, sulfurous acid, etc., and as the pH controlling agents, there are other inorganic acids, other organic acids, ammonium and alkali hydroxides, etc.

As will be appreciated by one skilled in the art, the above listing is merely illustrative and no criticallity is attached to the exact complexing agent, pH buffer or pH controlling agent used. As will further be appreciated by one skilled in the art, certain of the above compounds can illustrate more than one of the above functions, for example, certain compounds act as a complexing agent and simultaneously as a pH buffer.

The following discussion deals with preferred embodiments of electrolytes as are used in the present invention. As will be appreciated from the following discussion, the electrolyte used for electrolyzing ferromagnetic chromium dioxide particles can contain a transition metal to improve the properties of the system. However, for reasons which are not entirely understood, the presence of an electrolyte which contains a transition element when ferromagnetic iron oxide particles are being electrolyzed serves to increase the ferromagnetic properties of the thus treated ferromagnetic iron oxide particles to a suprisingly unexpected degree which was not, in fact, suspected by the inventors prior to the completion of the present invention. While somewhat of an improvement of the ferromagnetic properties of chromium dioxide particles can be achieved using an electrolyte which contains a transition element, it can fairly be said, in the opinion of the inventors, that the improvement achieved with ferromagnetic iron oxide particles using an electrolyte containing transition elements is a difference in kind.

For example, with ferromagnetic chromium dioxide particles the hydroxides, halides, carbonates, sulfates, nitrates, oxides, acetates, chromates, manganates, etc., of the elements belonging to groups Ia (Li, Na, K, Rb, Cs, Fr) and IIa (Be, Mg, Ca, Sr, Br, Ra) of the Periodic Table can be dissolved in the aqueous medium.

Furthermore, the oxides, halides, sulfates, nitrates, etc., of the transition elements belonging to groups Ib (Cu, Ag, Au), IIb (Zn, Cd, Hg), VIb (Cr, Mo, W), VIIb (Mn, Tc, Re), VIII (Fe, Co, Ni, Ru, Rh, Pd, Os, Ir, Pt) of the Periodic Table can also be dissolved in the aqueous medium.

Still further, the alkali metal salts of the oxyacids of the above-mentioned compounds can be also used.

The transition element suitably used in this invention when ferromagnetic iron oxide particles are being electrolyzed is at least one member selected from the group consisting of the elements belonging to groups IIIb, IVb, Vb, VIb, VIIb, VIII, Ib, and IIb of the Periodic Table.

Specific examples of these elements are Sc, Y, La, Ce, and Sm in group IIIb; Ti, Zr, and Hf in group IV; V, Nb, and Ta in group Vb; Cr, Mo, and W in group VIb; Mn, Tc, and Re in group VIIb; Fe, Co, Ni, Ru, Rh, Pd, Os, Ir, and Pt in group VIIIb; Cu, Ag, and Au in group Ib; and Zn, Cd, and Hg in group IIb. Among these elements, Ti, V, Cr, Mn, Co, Ni, Cu, Zn, Cd, Mo, and W are preferred, and in particular Co, Ni, Mn, Cu, Zn, and Cr are most preferred. Furthermore, it is most preferred that cobalt be used as at least a part of the transition elements.

These elements are conveniently added to the electrolyte 3 as the soluble salts such as the sulfates, nitrates, acetates, or halides thereof.

The salts used must be soluble and an electroconductive are necessary. The four types of salts are only examples of those conveniently used industrially.

As will be apparent to one skilled in the art, the electrolytes of the above embodiments are interchangeable between both embodiments, keeping in mind that in the ferromagnetic chromium dioxide embodiment, it is preferred to have an electroconductivity of a high overvoltage and in the ferromagnetic iron oxide embodiment, it is necessary that an element be present to change the quality of the Fe-Oxide.

The electrolyte selected for use in the present invention preferably has a conductivity more than about 50 milli-mho/cm (m$\Omega$/cm), most preferably more than 80 milli-mho/cm. The electric conductivity is preferred to be high, but the upper limit is decided by the kind of metal salt(s) used since various metal salts have differing saturation concentrations.

The amount of the soluble salt(s) added to the electrolyte is about 0.01 – 40% by weight, preferably about 0.05–25% by weight, based on the total weight of the electrolyte when ferromagnetic iron oxide particles are being electrolyzed. On the other hand, when ferromagnetic chromium dioxide particles are being electrolyzed, the earlier recited materials are generally dissolved in water in range of 0.01 – 10% by weight, same basis.

As mentioned above, one highly preferred embodiment this invention relates to a process of producing ferromagnetic materials in which magnetite ($Fe_3O_4$) iron oxide particles and Berthollide type iron oxide ($FeO_x$, $1.33 < x < 1.50$) particles having a high electrical conductivity are used, where a transition element is uniformly incorporated in the iron oxide particles by a cathodic treatment.

Since in iron oxide based ferromagnetic particles obtained by the process of this invention, for example, cobalt attaches uniformly to the particles, particles possessing an unusually high coercivity (causing poor erasure) and particles possessing an unusually low coercivity (reducing the printthrough characteristics) are not substantially formed.

Following the completion of the electrolysis, the ferromagnetic particles are typically separated from the electrolyte, washed, and dried. However, when ferromagnetic iron oxide particles are electrolyzed in accordance with the present invention, it has further been discovered that an unexpected improvement in the ferromagnetic properties thereof can be achieved by heat-treating the same, as will later be described.

It will be appreciated by one skilled in the art that the ferromagnetic particles which can be treated in accordance with the present invention are not particularly limited, i.e., the present invention is of wide application in that it involves electrolyzing ferromagnetic particles in a system wherein there is present at least one cathode carrying thereon the same ferromagnetic particles. The present invention does, however, find particular application with certain ferromagnetic iron oxide particles and with chromium dioxide particles, which will now be discussed in detail.

Discussing the iron oxides suitably used as a raw materials for the process of this invention, there are magnetic ($Fe_3O_4$) and spinel type Berthollide iron oxides ($FeO_x$, $1.33 < x < 1.50$). These iron oxides can be prepared by the heat-dehydration, baking, or reduction (including partial reduction) of goethite (alpha-FeOOH), beta-FOOH, or lepidocrocite (gamma-FeOOH). Also, the ferromagnetic iron oxide prepared by reduction (including a partial reduction) of acicular maghemite (gamma-$Fe_2O_3$) can be also suitably used in the process of this invention. These iron oxides are described in, for example, Japanese Patent Publications 5009/64, 10307/64, and 39639/73. In order that the Berthollide iron oxide have good electric conductivity, it is important that divalent iron and trivalent iron be present together in the Berthollide iron oxide, and it is particularly preferred that 5 – 90 wt.% of the total iron be divalent iron and the balance trivalent iron.

Iron oxide particles particularly suitable in the process of this invention are those having a high electrical conductivity, for example, a specific resistance of less than about $10^5 \Omega$ cm (ohm. cm). However, the effects of this invention are shown if the specific electric resistance is higher than this value. Iron oxide particles possessing a comparatively low conductivity, such as gamma-$Fe_2O_3$, can be also used in this invention since the transition element is deposited thereon as an oxide or hydroxide thereof near the cathode in the electrolysis. After the electrolysis is completed, the iron oxide particles are recovered from the electrolyte and then washed well with water. In this case, it is preferred that the iron oxide particles be washed with water until the electrical conductivity of the washing water becomes lower than about 500 micro mhos when 100 g of the iron oxide particles are brought into contact with one liter of deionized water. If washing is insufficient, the magnetizable layer formed using the ferromagnetic iron oxide particles shows reduced mechanical properties. After washing, the iron oxide particles thus treated are dried and then, if desired, subjected to heat treatment.

The heat treatment is performed at about 120 to about 750° C, preferably 180°–450° C. If the temperature is higher than the upper limit, the ratio of the acicular particles is apt to be reduced, while if the temperature is lower than the lower limit, the maximum effects of effect of the heating are reduced. The heat treatment can be performed in vacuum, in a reducing atmosphere such as hydrogen gas or in, an inert gas (e.g., neon, argon, kripton, xenon, etc.), or in an oxidizing atmosphere such as air or oxygen. By selecting suitably the atmosphere for heating, the degree of oxidation of iron in the ferromagnetic iron oxide particles can be controlled to about a 0 to 1.50 $x$ value ($FeO_x$), preferably $1.33 < X < 1.50$. For example, when $\gamma$-$Fe_2O_3$ (maghemite) is converted to $FeO_x$, $x = 1.50$, where Berthollide iron oxides are converted to $FeO_x$, the following applies: $1.33 < X < 1.50$, where $Fe_3O_4$ (magnetite) is converted to $FeO_x$, $x = 1.33$, where FeO is converted to $FeO_x$, $0 < X < 1.33$ and for iron metal, of course, $x = 0$.

If a strong reducing atmosphere is selected, the iron oxide is reduced into metallic iron. The metallic iron thus formed in/on the ferromagnetic iron oxide particles is also suitable as a material for a magnetic recording medium. Such ferromagnetic iron-base alloy particles are described in, for example, Japanese Patent Publication 4825/62 and U.S. Pat. No. 3,702,270. The period of time required for the heat treatment is about 20 minutes to about 48 hours, in particular, 2–30 hours.

The above processing can also be applied to other ferromagnetic particles such as chromium dioxide ferromagnetic particles, to achieve a lesser, but analogous effect.

Insofar as the ferromagnetic chromium dioxide particles suitable for processing in accordance with the present are concerned, these are conventional and can be selected without limitation. Typical examples thereof, are described for example, in U.S. Pat. Nos. 3,449,073; 3,278,263; 3,696,039; 3,371,043; 3,687,851; 3,600,315; 3,600,314; 3,778,373; 3,574,115; 3,687,851; 3,583,917; 3,726,714; 2,886,365; 2,923,683.

On the other hand, it has been confirmed by X-ray diffraction, electron diffraction, etc., that the surface of chromium dioxide particles treated by the process of this invention is mainly composed of a hydrate of chromium. Also, the surface of the particles often further contains a small amount of the material of the electrodes. For example, when lead is used as the cathode or anode, lead is observed on the surface of the chromium dioxide particles in the form of lead chromate. This is not a significant aspect of the present invention as the quantities present are insignificant.

Using the ferromagnetic particles obtained by the process of this invention, magnetic recording media can be prepared in a conventional manner.

Conveniently, the ferromagnetic particles are dispersed in a binder and the dispersion applied on a support using an organic solvent and dried to form a magnetizable layer on the support.

Methods of producing magnetic coating compositions of the ferromagnetic particles treated by the process of the present invention are described in detail in Japanese Patent Publications Nos. 186/68, 28043/72, 28045/72, 28046/72, 28048/72, 31445/72, U.S. Pat. Nos. 3,366,505, 3,437,510, 3,475,356, 3,499,789, 3,558,492, 3,592,687, 3,597,273, 3,634,137, 3,655,595, 3,781,210 and 3,840,400 etc. The magnetic coating compositions described therein mainly comprise ferromagnetic particles, a binder, and a coating solvent, and in addition, the composition can contain conventional additives such as a dispersing agent, a lubricant, an abrasive, an antistatic agent, and the like.

Conventional binders are used in the case of preparing magnetic recording media using the ferromagnetic particles and include thermoplastic resins, thermosetting resins, and mixtures thereof.

Preferred thermoplastic resins are those resins which have a softening point of about 150° C or less, an average molecular weight of about 10,000 to 200,000, and a degree of polymerization on the order of about 200 to 2,000, e.g., a vinyl chloride-vinyl acetate copolymer, a vinyl chloride-vinylidene chloride copolymer, a vinyl chloride-acrylonitrile copolymer, an acrylate-acrylonitrile copolymer, an acrylate-vinylidene chloride copolymer, an acrylate-styrene copolymer, a methacrylate acrylonitrile copolymer, a methacrylate-vinylidene chloride copolymer, a methacrylate-styrene copolymer, a urethane elastomer, polyvinyl fluoride, a vinylidene chloride-acrylonitrile copolymer, a butadiene-acrylonitrile copolymer, a polyamide resin, polyvinyl butyral, cellulose derivatives such as cellulose acetate butyrate, cellulose diacetate, cellulose triacetate, cellulose propionate, cellulose nitrate, and the like, a styrene-butadiene copolymer, a polyester resin, a chlorovinyl ether-acrylate copolymer, an amino resin, various synthetic rubber based thermoplastic resins, and mixtures thereof.

Suitable examples of these resins which can be used are described in Japanese Patent Publications Nos. 6877/1962, 12528/1964, 19282/1964, 5349/1965, 20907/1965, 9463/1966, 14059/1966, 16985/1966, 6428/1967, 11621/1967, 4623/1968, 15206/1968, 2889/1969, 17947/1969, 18232/1969, 14020/1970, 14500/1970, 18573/1972, 22063/1972, 22064/1972, 22068/1972, 22069/1972, 22070/1972, 27886/1973, U.S. Pat. Nos. 3,144,352, 2,419,420, 3,499,789, 3,713,887, etc.

Preferred thermosetting resins have a molecular weight of about 200,000 or less as a coating solution, and when heated after coating and drying, the molecular weight becomes essentially infinite due to reactions such as condensation, addition, and the like. Of these resins, most preferred resins are those resins which do not soften or melt before the resin thermally decomposes. Representative examples of such resins are a phenol resin, an epoxy resin, a polyurethane hardening type resin, a urea resin, a melamine resin, an alkyd resin, a silicone resin, an acrylic based reactive resin, an epoxy-polyamide resin, a mixture of a high molecular weight polyester resin and an isocyanate prepolymer, a mixture of a methacrylic acid salt copolymer and a diisocyanate prepolymer, a mixture of a polyesterpolyol and a polyisocyanate, a urea formaldehyde resin, a mixture of a low molecular weight glycol, a high molecular weight diol, and triphenylmethane triisocyanate, a polyamine resin, and mixtures thereof, etc.

Many examples of resin which can be used are described in Japanese Patent Publications Nos. 8103/1964, 9779/1965, 7192/1966, 8016/1966, 14275/1966, 18179/1967, 12081/1968, 28023/1969, 14501/1970, 24902/1970, 13103/1971, 22065/1972, 22066/1972, 22067/1972, 22072/1972, 22073/1972, 28045/1972, 28048/1972, 28922/1972, U.S. Pat. Nos. 3,144,353, 3,320,090, 2,437,510, 3,597,273, 3,781,210, 3,781,211, etc.

These binders can be used individually or in combination with each other, and other additives can be added to the binders. The weight ratio of the ferromagnetic powder to the binder is generally about 100:10 to 100:200. When the proportion of the binder is less than about 10 parts by weight, the ability of the binder to bind the ferromagnetic powder becomes weak, and the ferromagnetic powder tends to come off the magnetic layer. This leads to the disadvantage that the ferromagnetic powder that has come off adheres to the magnetic head, or damages the surface of the magnetic layer. On the other hand, when the proportion of the binder is above about 200 parts by weight, the magnetic flux density of the magnetic layer is reduced because the non-magnetic properties of the binder dominate the layer characteristics.

In addition to the above described binder and ferromagnetic powder, additives such as a dispersing agent, a lubricant, an abrasive, an antistatic agent, and the like can be used in the magnetic recording layer.

Commonly used and easily available dispersing agents are fatty acids containing about 12 to 18 carbon atoms (e.g., having the formula $R_1COOH$ wherein $R_1$ is an alkyl on alkenyl group containing about 11 to 17 carbon atoms), e.g., caprylic acid, capric acid, lauric acid, myristic acid, palmitic acid, stearic acid, oleic acid, elaidic acid, linolic acid, linolenic acid, stearolic acid, and the like; metallic soaps comprising the alkali metal (Li, Na, K, etc.) salts or the alkaline earth metal (Mg, Ca, Ba, etc.) salts of the above described fatty acids; and lecithin, etc. In addition, higher alcohols containing about 12 or more carbon atoms and the sulfates thereof can be used. These dispersing agents are generally employed in a proportion of about 0.5 to 20 parts by weight per 100 parts by weight of the binder. Suitable dispersing agents are also described in Japanese Patent Publications Nos. 28369/1964, 17945/1969 and 15001/1973 and U.S. Pat. Nos. 3,387,993 and 3,470,,021.

Conventional lubricants as can be used include silicone oils, graphite, molybdenum disulfide, tungsten disulfide, fatty acid esters produced from a monocarboxylic acid containing about 12 to 16 carbon atoms and a monovalent alcohol containing about 3 to 12 carbon atoms, fatty acid esters produced from a monocarboxylic fatty acid containing about 14 or more carbon atoms and monovalent alcohol containing 1~5 carbon atoms, in which the total number of carbon atoms ranges from about 15 to 28, and the like. These lubricants are conveniently used in a proportion of about 0.2 to 20 parts by weight per 100 parts by weight of the binder. Such lubricants are described in Japanese Patent Publication No. 23889/1968, 18482/1973, 24041/1973, U.S. Pat. Nos. 3,470,021, 3,492,235, 3,497,411, 3,523,086, 3,625,760, 3,630,772, 3,634,253, 3,642,539, 3,687,725, IBM Technical Disclosure Bulletin, Vol. 9, No. 7, page 779 (December 1966), ELEKTRONIK, No. 12, page 380 (1961), etc.

Conventional abrasive agents can be used, e.g., fused alumina, silicon carbide, chromium oxide, corundum, synthetic corundum, diamond, synthetic diamond, garnet, emery (main component: corundum and magnetite), and the like. Those abrasive agents are used which have an average particle size of about 0.05 to 5 $\mu$m, preferably about 0.1 to 2 $\mu$m.

The above abrasives are conveniently used in a proportion of from about 0.5 to 20 parts by weight per 100 parts by weight of the binder.

The above abrasive agents are described in Japanese Patent Application (OPI) No. 115510/1974, U.S. Pat. Nos. 3,007,807, 3,041,196, 3,293,066, 3,630,910, 3,687,725, British Pat. No. 1,145,349, West German Patents Nos. 853,211, and 1,001,000, etc.

Antistatic agents which can be used in the present invention, include conventional inorganic materials such as carbon black and organic materials, for example, natural surface active agents such as saponin; nonionic surface active agents such as alkylene oxide based, glycerin based and glycidal based surface active agents, and the like; cationic surface active agents such as heterocyclic compounds, e.g., higher alkylamines, quaternary ammonium salts, pyridine, and the like, phosphoniums, sulfoniums, and the like; anionic surface active agents containing acid groups such as carboxylic acid groups, sulfonic acid groups, phosphoric acid groups, sulfate groups, phosphate groups, and the like; amphoteric surface active agents such as sulfates or phosphates of amino acids, amino sulfonic acids, and amino alcohols, and the like; etc. A suitable amount of the inorganic material is about 5% by weight and of the organic material is about 0.5 to 1% by weight, each based on the weight of the ferromagnetic material.

Examples of the surface active agents that can be used as antistatic agents are described in U.S. Pat. Nos. 2,271,623, 2,240,472, 2,288,226, 2,676,122, 2,676,924, 2,676,975, 2,691,566, 2,727,860, 2,730,,498, 2,742,379, 2,739,891, 3,068,101, 3,158,484, 3,201,253, 3,210,191, 3,294,540, 3,415,649, 3,441,413, 3,442,654, 3,475,174, 3,545,974, West German Patent Application (OLS) No. 1,942,665, British Pat. Nos. 1,077,317, 1,198,450, Ryohei Oda, et al. *Kaimen Kassei Zai no Gosei to so no Oyo* (*Synthesis of Surface Active Agents and Their Applications*), Maki Shoten, Tokyo (1964), A. M. Schwartz et al *Surface Active Agents* Interscience Publications Corp., New York (1958), J. P. Sisley et al. *Encyclopedia of Surface Active Agents*, Vol. 2, Chemical Publishing Co., New York (1964), Kaimen Kassei Zai Binran (*Handbook of Surface Active Agents*), 6th Ed., Sangyo Tosho Co., Tokyo Dec. 20, 1966, etc.

These surface active agents can be used individually or in combination with each other. These surface active agents are generally used as antistatic agents, but in some cases, they can be used for other purposes, for example for improving dispersibility, magnetic properties, and lubricity, or as auxiliary coating agents.

The magnetic recording layer is formed by dispersing the above described composition in an organic solvent and then coating the resulting dispersion on a support.

The non-magnetic support is conventional and generally will have a thickness of about 3 to 50 $\mu$m, preferably 10 to 40 $\mu$m. If the thickness is less than about 3 $\mu$m, the tensile strength of the support required as a magnetic recording material may decrease, and the support may tend to break or deform. If the thickness exceeds about 50 $\mu$m, the volume and weight of the magnetic recording material increases, and therefore, the recording density per unit volumme or weight decreases. Suitable known materials which can be used for producing the support are polyesters such as polyethylene terephthalate, polyethylene-2, 6-naphthalate, and the like, polyolefins such as polypropylene, and the like, cellulose derivatives such as cellulose triacetate, cellulose diacetate, and the like, polycarbonate, etc.

The support can be subjected to a back coating of the surface opposite to that having the magnetic layer thereon, for the purpose of preventing charging, magnetic print-through and so on, if desired. Suitable back coating techniques are described in, for example, U.S. Pat. Nos. 2,804,401, 3,293,066, 3,617,378, 3,062,676, 3,734,772, 3,476,596, 2,643,048, 2,803,556, 2,887,462, 2,923,642, 2,997,451, 3,007,892, 3,041,196, 3,115,420, and 3,166,688.

The magnetic recording layer can be coated on the support using any conventional coating method such as air doctor coating, blade coating, air knife coating, squeeze coating, dip coating, reverse roll coating, transfer roll coating, gravure coating, kiss coating, cast coating, spray coating, and the like. Other methods can be also used. These methods are described in *Coating Kogaku* (*Coating Engineering*), pages 253 to 277, published by Asakura Shoten (Mar. 20, 1971).

Conventional organic solvents are used in the present invention and include ketones, e.g., acetone, methyl ethyl ketone, methyl isobutyl ketone, cyclohexane, and the like; alcohols, e.g., methanol, ethanol, propanol, butanol, and the like; esters, e.g., methyl a-etate; ethyl acetate, butyl acetate, ethyl lactate, glycol monoethyl ether acetate, and the like; ethers and glycol ethers, e.g., diethyl ether, glycol monoethyl ether, glycol dimethyl ether, dioxane, and the like; aromatic hydrocarbons, e.g., benzene, toluene, xylene, and the like; chlorinated hydrocarbons, e.g., methylene chloride, ethylene chloride, carbon tetrachloride, chloroform, ethylene chlorohydrin, dichlorobenzene, and the like, etc., and these solvents can be used individually or in combination with each other.

The magnetic layer coated on the support by the above method is dried after, if desired, the coating has been subjected to a treatment to orient the ferromagnetic particles in the layer. Suitable treatments for orienting the ferromagnetic particles in the layer are disclosed in U.S. Pat. Nos. 1,949,840, 2,796,359, 3,001,891, 3,172,776, 3,416,949, 3,473,960, and 3,681,138; Japanese Patent Publications 3427/1957, 28368/1964, 23624/1965, 23625/1965, 13181/1966, 13043/1973 and 39722/1973. If required, the magnetic layer can be subjected to a surface-smoothening treatment, or cut to the desired shape, to thereby form the magnetic recording material of this invention. Suitable surface-smoothening techniques are disclosed U.S. Pat. Nos. 2,688,567, 2,998,325, and 3,783,023, and German Patent Application (OPI) 2,405,222.

In the above orienting treatment for the magnetic layer, the orienting magnetic field can be either an AC or DC magnetic field with a field strength of about 500 to 2000 gauss. The drying temperature can range from about 50 to about 100° C, and the drying time is about 3 to 10 minutes.

In the surface-smoothening treatment of the magnetic layer, preferably a calendering method is used in which the magnetic layer is passed between a metal roll and a non-metallic roll while the layer is heated under pressure. A combination of a metal roll and a roll made of cotton and a combination of a metal roll and a roll made of a synthetic resin are especially preferred. The pressure used in this treatment is about 25 to 500 Kg/cm, and the surface temperature of the metal roll is kept at about 35° to 150° C. The rate of the treatment is about 5 to 120 meters/min. When the pressure and temperature are below the lower limits of the above-specified ranges, the effect of the surface-smoothening treatment is difficult to achieve. Pressures and temperatures higher than the upper limits of the above specified ranges are not preferred because the support of the magnetic recording material is deformed. When the treating rate is less than about 5 meters/min. the operating efficiency is low and if the rate is above about 120 meters/min., the operation is difficult.

The present invention will be explained in detail with reference to the following examples. It will be obvious to one skilled in the art that various changes and modifications can be made in the components, ratios, operational order, and the like without departing from the spirit of the present invention. Therefore the present invention should not be construed as being limited to the following examples.

All parts, percents, ratios and the like are by weight unless otherwise indicated.

EXAMPLE 1

Into a 80 liter cylindrical steel barrel lined with lead there was placed 20 liters of an aqueous solution of 4% by weight cobalt sulfate. The barrel was then vertically inclined 45°. The anode used was a cobalt rod 4 cm. in diameter and it was immersed in the aqueous solution of cobalt sulfate.

Then, 1.2 kg. of iron oxide particles (FeO$_x$, $x = 1.39$; mean axial length 0.4 micron; acicular ratio 7.5; coercivity 390 Oe.) were placed in the barrel. After precipitating the iron oxide particles (allowing them to fall to the bottom of the barrel), a d.c. potential of 6 volts was applied between the barrel as a cathode and the cobalt anode while rotating the barrel at a speed of 2 r.p.m. Generation of hydrogen was observed on the inside wall of the barrel. After passing the electric current for 5 minutes, the contents of the barrel were recovered by filtration. The iron oxide particles thus recovered were washed with deionized water until the conductivity of the washing water became 400 micro mhos.

The iron oxide particles were then dried overnight at 110° C in an air drying machine. The black iron oxide particles thus obtained were pulverized, placed in an electric furnace maintained at 300° C and heated for 8 hours. During the heat treatment, a 1 : 10 volume mixture of hydrogen and nitrogen at 1 atm. was slowly passed through the electric furnace.

When the ferromagnetic material thus heat-treated was analyzed, it was confirmed that the product contained in addition to Fe and unavoidable impurities, 1.8 atomic parts of cobalt and 0.2 atomic parts of lead per 100 atomic parts of iron. The coercivity of the ferromagnetic material thus obtained was 565 Oe. This ferromagnetic material was referred to as Sample P-1. The presence of lead was considered to be due to the use of lead as the lining for the inside wall of the barrel.

COMPARISON EXAMPLE 1

(Producing cobalt ferrite by a conventional method)

1 Kg. of the iron oxide particles used in Example 1 as a starting material were added to 10 liters of deionized water at 25° C followed by stirring. Then, 120 g of cobalt sulfate hydrate ($CoSO_4.7H_2O$) was added to the iron oxide slurry. Then, while stirring the slurry, a 2 N aqueous sodium hydroxide solution was dropwise added to the slurry to increase the pH thereof to 10.0. Thereafter, the slurry was further stirred for 30 minutes at room temperature.

The iron oxide particles were then collected from the slurry by filtration and washed with deionized water. Then, by following the same steps after washing as in Example 1 (conductivity of the wash water removed was 400 ν(micro mho)), cobalt-containing iron oxide particles (cobalt content of 1.9 atomic parts per 100 atomic parts of iron) were obtained. The coercivity of the ferromagnetic material obtained was 575 Oe. This material was referred to as Sample CP-1.

Magnetic recording tapes were prepared using the two ferromagnetic materials, Samples P-1 and CP-1, thus obtained. That is, the following composition was mixed in a ball mill and, after adding thereto 6 parts of Desmodur L-75 (75 wt% ethyl acetate solution of the reaction product of 3 moles of toluene diisocyanate and 1 mole of trimethylolpropane, a polyisocyanage compound, made by Farbenfabriken Bayer A.G., m.w. ca 560) and the mixture mixed uniformly to provide a magnetic coating composition.

| | |
|---|---|
| Ferromagnetic material (Sample P-1 or CP-1) | 100 parts |
| Copolymer of vinyl chloride and vinyl acetate (copolymerization ratio 7:3, polymerization degree 450) | 9 parts |
| Epoxy resin (Trade Name: Epikote 834 produced by Shell Chemical Co. Bisphenol A type, content of epoxy groups 0.56, m.w.; Ca 470) | 8 parts |
| Silocone oil (dimethyl polysiloxane; viscosity; 30 centipoise (25° C)) | 2 parts |
| Toluene | 75 parts |
| Methyl isobutyl ketone | 75 parts |

The coating composition was coated on one surface of a polyethylene terephthalate film 20 micron thick to a dry a thickness of 5 microns. Before the coated layer was dried, the coated layer was subjected to orientation (2,000 gauss) in a magnetic field using a magnet so that the ferromagnetic particles were directed along the longitudinal direction of the PET film. After drying at 100° C, the surface of the magnetizable layer was calendered (pressure: 80 kg/cm; temp.: 85° C; passed between metal-cotton roll-pair 4 times) and then the tape was slit in ½ inch wide magnetic recording tapes. The two kinds of magnetic recording tape thus prepared were referred to as Tapes T-1 and CT-1, respectively.

The magnetic properties of the tapes are shown in Table 1.

Table 1

| Sample | Coercivity (Hc (oe.) | H/2* | Br/Bm | (A)** (dB) | (B)*** (dB) | (C)**** (dB) |
|---|---|---|---|---|---|---|
| T-1 | 550 | 145 | 0.82 | ±0 | −70 | 55 |
| CT-1 | 558 | 160 | 0.78 | −0.8 | −59 | 48 |

*Half of the peak value of the differential curve of B-H obtained by measuring in a magnetic field of 2,000 oersteds.
**Video sensitivity when signals of 5 MHz were recorded without bias and reproduced using a VTR having a helical scanning type head ½inch wide.
***The erasure characteristic when signals of 1 KHz were recorded and then erased using an erasure head at an erasure current of 0.5 ampere.

As is clear from the results shown in the above table, the magnetic tape prepared using Sample P-1 has a narrower coercivity distribution and a higher squareness ratio than the tape produced using Sample CP-1. Thus, in the magnetic tape recorded signals could be easily erased and the print-through characteristics were superior. These results show that cobalt was incorporated uniformly in the iron oxide particles.

EXAMPLE 2

When the same procedure as in Example 1 was followed except that an aqueous solution containing 3.8% by weight of cobalt sulfate and 0.4% by weight of manganese sulfate was used in place of the aqueous solution of 4% by weight of cobalt sulfate, ferromagnetic particles (Sample P-2) containing 1.7% by weight of cobalt, 0.15% by weight of lead and 0.3% by weight of manganese and possessing a coercivity of 5500 oersteds were obtained. Using Sample P-2 thus prepared, a magnetic recording tape (Tape T-2) was prepared in the same manner as in Example 1. Tape T-2 possessed the same characteristics as Tape T-1 and, in particular, Tape T-2 was superior to Tape T-1 in erasure characteristics.

EXAMPLE 3

Five parts by weight of chromium dioxide particles (total of 30 g) were supported by magnetic attraction on a metallic magnet (ca. 25 × 25 × 100 mm) coated with a lead layer 0.1 mm thick and having magnetic field of 2,000 oersteds at the surface thereof. The chromium dioxide particles were prepared by a high pressure method, had a mean axial length of 0.45 μm, an axial ratio of 6.5, a saturation magnetization of 83.1 emu./g., and contained a small amount of tellurium (0.9 wt% based on $CrO_2$). 100 parts by weight of water containing dissolved therein 2 parts by weight of chromic anhydride was used as the electrolyte. The anode used was a carbon rod (2 cm φ).

The magnetic cathode carrying thereon the chromium dioxide particles by magnetic attraction and the anode were placed in the electrolyte in an electrolysis vessel (1 l glass beaker; cathode on the bottom) and a d.c. potential of 10 volts was applied between the magnetic cathode and the carbon anode. The temperature of the electrolyte was 23° C. A d.c. current of about 0.7 ampere was passed therethrough and a slight generation of hydrogen gas was observed on the cathode. After passing the electric current for 10 minutes, the chromium dioxide particles were collected from the magnetic cathode and washed twice with 60 parts of water. The chromium dioxide particles thus obtained were referred to as Sample No. 1. By X-ray diffraction analysis of this sample, a diffraction line considered to be originated from CrOOH was observed. The chromium dioxide particles used in this example as the raw material did not contain CrOOH.

EXAMPLE 4

Into a barrel having tin-coated interior were placed 250 parts of an electrolyte containing 5 parts of chromium dioxide particles as were used in Example 3 and 1 part of sodium hydroxide, and after inclining the barrel (capacity 1 liter), it was rotated at a speed of 4 r.p.m. A carbon rod was immersed in the electrolyte in the barrel as an anode and a d.c. potential of 15 volts was applied between the barrel and the anode, whereafter, the generation of hydrogen was observed. A 0.84 ampere electric current was passed in this case. After passing the electric current for 10 minutes, the chromium dioxide particles were collected from the barrel and washed once with 60 parts of water. All processing were at room temperature as was the case with all Examples unless otherwise indicated. The chromium dioxide particles thus treated were referred to as Sample No. 2.

The magnetic properties of the Samples prepared in Examples 3 and 4 and also the chromium dioxide particles used in the examples as raw materials were measured. The results are shown in Table 2.

Table 2

| Sample | Saturation magnetization before testing* | Saturation magnetization after testing** | Dissolved amount of $Cr^{6+}$ (ppm)*** |
|---|---|---|---|
| Raw material (Comparison) | 83.1 | 80.8 (−14.8%) | 24.7 |
| Sample No. 1 | 80.0 | 73.2 (−8.5%) | 14.0 |
| Sample No. 2 | 79.7 | 74.2 (−6.9%) | 10.2 |

*$\delta S_1$: expressed as emu/g.
**$\delta S_2$: The magnetic recording tapes prepared as in Example 5 using the Samples and the raw material were stored for one week at 90° C and 90% R.H. and then the saturation magnetization was calculated from the reduction percentage of the saturation magnetic flux. The reduction percentage is shown in the parenthesis.
***The value (ppm) of $Cr^{6+}$ formed in water when 5 g of the chromium dioxide particles were immersed in 30 ml of distilled water at 20° C for 30 minutes.

As is clear from the results, the initial saturation magnetization ($\Sigma S_1$) of the chromium dioxide particles was slightly reduced by the treatment of this invention, but the saturation magnetization ($\Sigma S_2$) of the particles after testing was higher with the chromium dioxide particles treated by the process of this invention than the raw material. This shows that the chromium dioxide particles were stabilized by the treatment of this invention.

Also, it is clear that the amount of dissolved $Cr^{6+}$ was lower with the chromium dioxide particles treated by the process of this invention as compared with the raw material.

EXAMPLE 5 AND COMPARISON EXAMPLE 2

A magnetic recording layer having the following composition containing the chromium dioxide particles used as the raw material in the aforesaid examples or the chromium dioxide particles treated as in Example 4 was formed on a polyester film 19 μm thick to a dry thickness of 6 μm.

| | |
|---|---|
| Copolymer of vinyl chloride, vinyl acetate and vinyl alcohol (80:17:3, molar) | 50 parts |
| Chromium dioxide particles | 280 parts |
| Amyl stearate | 3 parts |
| Silicone oil (dimethyl polysiloxane; 100 cs at 25° C) | 3 parts |

The surface of the magnetic recording layer was calendered in a conventional manner (pressure: 80 kg/cm; temp.: 85° C; passed between metal-cotton roll-pair 4 times). The magnetic properties of the two magnetic recording tapes thus obtained are shown in Table 2.

Table 2

| | $CrO_2$ | (A) Hc (Oe) | (B) Br/Bm | (C) dB | (D) dB |
|---|---|---|---|---|---|
| Example 5 | Sample No.2 | 485 | 0.89 | ±0.0 | −1.4 |
| Comparison Example 2 | Raw material | 493 | 0.88 | +0.8 | −2.7 |

(A) Coercivity: The measurement magnetic field was 2,000 oersteds.
(B) Squareness ratio: The measurement magnetic field was 2,000 oersteds.
(C) Initial video sensitivity: Non-biased recording at 4 MHz; the initial value in Example 5 was used as the standard value (±0 dB).
(D) Video sensitivity after storing the tapes for 2 months at 45° C and 80% R.H.

As is clear from the results, it was confirmed that a magnetic recording tape showing less change with the passage of time could be obtained using chromium dioxide particles treated by the process of this invention.

While the invention has been described in detail and with reference to specific embodiments thereof, it will be apparent to one skilled in the art that various changes and modifications can be made therein without departing from the spirit and scope thereof.

What is claimed is:

1. A process for improving the properties of a ferromagnetic material which comprises electrolyzing the ferromagnetic particles in an aqueous medium having a conductivity of greater than 50 milli moh/cm, containing a water-soluble electroconductive salt, and containing an anode and cathode while said ferromagnetic particles are in electrical contact with the cathode.

2. A process as in claim 1 wherein the ferromagnetic particles are ferromagnetic chromium dioxide.

3. A process as in claim 2 in which said electrolysis is carried out with an electric potential of about 0.2 to about 40 volts.

4. A process as in claim 2 in which said electrolysis is carried out in an electrolyte of a pH about 1 to about 13.

5. A process as in claim 2 in which the electrolyte is water.

6. A process as in claim 2 in which the electrolyte is an aqueous solution of a water soluble electroconductive salt of an element belonging to Group Ia or IIa of the Periodic Table.

7. A process as in claim 2 in which the electrolyte is an aqueous solution of a water soluble electroconductive salt of an element belonging to Group Ib, IIb, VIb, or VIII of the Periodic Table.

8. A process as in claim 2 in which the electrolysis is carried out using a magnetic cathode carrying thereon the chromium dioxide particles by magnetic attraction.

9. A process as in claim 2 in which the electrolysis is carried out using a conductive container for the electrolyte as the cathode and the chromium dioxide particles are settled in the container.

10. The process of claim 2, wherein the amount of soluble salt of the one or more transition elements is 0.01 to 10% by weight of the water.

11. A process as in claim 1 wherein the ferromagnetic particles are iron oxide particles and the aqeuous medium contains at least one water soluble electroconductive salt of a transition element.

12. A process as in claim 11 which further comprises heating the iron oxide particles after electrolysis at about 120 to about 750° C for from about 20 minutes to about 48 hours.

13. A process as in claim 12 in which the iron oxide particles thus heat-treated are washed with water such that the electric conductivity of the wash water is less than about 500 micro mhos when 100 g of the iron oxide particles are washed with one liter of water.

14. A process as in claim 11 in which the iron oxide is magnetite or a spinel Berhollide iron oxide represented by the formula $FeO_x$, wherein $1.3 < x < 1.50$.

15. A process as in claim 11 in which the transition element is at least one member selected from the group consisting of the Elements belonging to Groups IIIb, IVb, Vb, VIb, VIIb, VIII, Ib, or IIb of the Periodic Table.

16. A process as in claim 11 in which said transition element is selected from the group consisting of cobalt, nickel, manganese, copper or zinc.

17. A process as in claim 11 in which said soluble salt is selected from the group consisting of a sulfate, a nitrate, an acetate or a halide.

18. A process as in claim 11 in which the amount of soluble salt of the one or more transition element is about 0.01 to about 40% by weight of the water.

19. The process of claim 11, in which the amount of soluble salt of the one or more transition elements is about 0.05 to 25% by weight of the water.

* * * * *